US00RE48758E

(19) United States
(12) Reissued Patent
Rinne et al.

(10) Patent Number: US RE48,758 E
(45) Date of Reissued Patent: Sep. 28, 2021

(54) TRANSFER OF PACKET DATA IN SYSTEM COMPRISING MOBILE TERMINAL, WIRELESS LOCAL NETWORK AND MOBILE NETWORK

(71) Applicant: Intellectual Ventures I LLC, Wilmington, DE (US)

(72) Inventors: Janne Rinne, Tampere (FI); Henry Haverinen, Jyvaskyla (FI)

(73) Assignee: Intellectual Ventures I LLC, Wilmington, DE (US)

(21) Appl. No.: 15/394,050

(22) Filed: Dec. 29, 2016

Related U.S. Patent Documents

Reissue of:
(64) Patent No.: 8,923,256
Issued: Dec. 30, 2014
Appl. No.: 10/538,420
PCT Filed: Jun. 24, 2004
PCT No.: PCT/FI2004/000386
§ 371 (c)(1),
(2) Date: Oct. 11, 2006
PCT Pub. No.: WO2006/000612
PCT Pub. Date: Jan. 5, 2006

(51) Int. Cl.
*H04L 12/911* (2013.01)
*H04L 29/06* (2006.01)
(Continued)

(52) U.S. Cl.
CPC ..... *H04L 47/70* (2013.01); *H04L 47/824* (2013.01); *H04L 47/825* (2013.01); *H04L 63/08* (2013.01);
(Continued)

(58) Field of Classification Search
USPC ..... 370/338
See application file for complete search history.

(56) References Cited

U.S. PATENT DOCUMENTS 6,714,515 B1 * 3/2004 Marchand ..... H04L 47/724 370/231
7,546,376 B2 * 6/2009 Widegren ..... H04L 12/14 709/232
(Continued)

FOREIGN PATENT DOCUMENTS

EP 1392077 A1 * 2/2004 ..... H04W 36/0011
WO WO-03/105007 A1 12/2003

OTHER PUBLICATIONS

Quality of Service Among IP—Based Heterogeneous Networks, Alam et al. IEEE Personal Communications, Dec. 2001 (Year: 2001).*
(Continued)

*Primary Examiner* — Nick Corsaro
(74) *Attorney, Agent, or Firm* — Foley & Lardner LLP

(57) ABSTRACT

A method of arranging the transmission of packet data in a system comprising a mobile terminal, a wireless local network and a mobile network that includes end-to-end service related parameters that are signalled via a separate signalling element. A resource authorization identifier is transmitted to the mobile network via the local network. Authorization is requested from the signalling element on the basis of the resource authorization identifier. A tunnel between the mobile terminal and the mobile network is bound to the end-to-end data flow of the mobile terminal on the basis of an authorization from the signalling element and tunnel identification information identifying the tunnel.

38 Claims, 2 Drawing Sheets

(51) Int. Cl.

| | |
|---|---|
| ***H04W 12/069*** | (2021.01) |
| *H04W 84/12* | (2009.01) |
| *H04W 28/18* | (2009.01) |
| *H04W 40/00* | (2009.01) |
| *H04W 72/04* | (2009.01) |

(52) U.S. Cl.

CPC ..... *H04L 63/0892* (2013.01); *H04W 12/069* (2021.01); *H04L 63/029* (2013.01); *H04L 63/0227* (2013.01); *H04L 63/162* (2013.01); *H04L 63/164* (2013.01); *H04W 28/18* (2013.01); *H04W 40/00* (2013.01); *H04W 72/042* (2013.01); *H04W 84/12* (2013.01)

(56) References Cited

U.S. PATENT DOCUMENTS

| | | | | |
|---|---|---|---|---|
| 2002/0036983 | A1* | 3/2002 | Widegren | H04L 47/10 370/230.1 |
| 2002/0184510 | A1* | 12/2002 | Shieh | H04L 47/824 713/185 |
| 2003/0041266 | A1* | 2/2003 | Ke et al. | 713/201 |
| 2003/0119483 | A1* | 6/2003 | Jeon | 455/411 |
| 2003/0163577 | A1* | 8/2003 | Moon et al. | 709/229 |
| 2004/0090937 | A1* | 5/2004 | Chaskar et al. | 370/331 |
| 2004/0267874 | A1* | 12/2004 | Westberg et al. | 709/200 |
| 2005/0007984 | A1* | 1/2005 | Shaheen et al. | 370/338 |
| 2005/0091409 | A1* | 4/2005 | Williams | H04L 67/1095 709/247 |
| 2005/0163078 | A1* | 7/2005 | Oba et al. | 370/331 |
| 2005/0195780 | A1* | 9/2005 | Haverinen et al. | 370/338 |
| 2005/0259679 | A1* | 11/2005 | Chowdhury et al. | 370/465 |

OTHER PUBLICATIONS

Interworking Architecture Between 3GPP and WLAN Systems, Ahmavaara et al., IEEE Communications Magazine, Nov. 2003 (Year: 2003).*

IP Mobility Support for IPsec-based Virtual Private Networks: an architectural soluttion, Berioli et al. GLOBECOM 2003 0-7803-7974-8/03 2003 IEEE (Year: 2003).*

Policy Based Architecture for the UMTS Multimedia Domain Wolfgang Böhm, et al. Proceedings of the Second IEEE International Symposium on Network Computing and Applications (NCA '03) 2003 IEEE (Year: 2003).*

U.S. Notice of Allowance on U.S. Appl. No. 10/538,420 dated Aug. 28, 2014.

U.S. Office Action on U.S. Appl. No. 10/538,420 dated Apr. 21, 2008.

U.S. Office Action on U.S. Appl. No. 10/538,420 dated Apr. 29, 2009.

U.S. Office Action on U.S. Appl. No. 10/538,420 dated May 21, 2014.

U.S. Office Action on U.S. Appl. No. 10/538,420 dated Jun. 14, 2010.

U.S. Office Action on U.S. Appl. No. 10/538,420 dated Aug. 29, 2008.

U.S. Office Action on U.S. Appl. No. 10/538,420 dated Nov. 26, 2013.

U.S. Office Action on U.S. Appl. No. 10/538,420 dated Dec. 1, 2009.

U.S. Office Action on U.S. Appl. No. 10/538,420 dated Dec. 23, 2008.

3rd Generation Partnership Project; Technical Specification (3GPP TS 23.234 V6.0.0 (Mar. 2004).*

"A Framework for Policy-based Admission Control", Yavatkar, et al., Network Working Group, Request for Comments: 2753, Category: Informational, Apr. 15, 2005, pp. 1-24.

"The Path toward the 4G Network and Services: The Wine Glass Vision", L. Dell Uomo, et al., 2003 Telecom Italia Lab S.p.A., pp. 169-175.

"Key Technologies of WLAN Accessing 3GPP PS Based Services", Hefei Hu, et al. IEEE 6$^{th}$ CAS Symp. On Emerging Technologies: Mobile and Wireless Comm. Shanghai, China, May 31-Jun. 2, 2004, pp. 137-139.

"3$^{rd}$ Generation Partnership Project; Technical Specification Group Services and System Aspects; 3GPP system to Wireless Local Area Network (WLAN) interworking; System Description (Release 6)", 3GGP TS 23.234 V6.0.0 (Mar. 2004), pp. 1-83.

"3$^{rd}$ Generation Partnership Project; Technical Specification Group Services and System Aspects; End-to-end Quality of Service (QoS) concept and architecture (Release 6)", 3GPP TS 23.207 V6.2.0 (Mar. 2004), pp. 1-52.

3$^{rd}$ Generation Partnership Project; Technical Specification Group Services and System Aspects; IP Multimedia Subsystem (IMS); Stage 2 (Release 6), 3GPP TS 23.228 V6.5.0 (Mar. 2004), pp. 1-174.

* cited by examiner

TRANSFER OF PACKET DATA IN SYSTEM COMPRISING MOBILE TERMINAL, WIRELESS LOCAL NETWORK AND MOBILE NETWORK

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED PATENT APPLICATION*

This application *is a Broadening Reissue of U.S. Pat. No. 8,923,256 (previously U.S. patent application Ser. No. 10/538,420, filed Oct. 11, 2006), which* is the National Stage of International Application No. PCT/FI2004/00386, International Filing Date, Jun. 24, 2004, which designated the United States of America, *the disclosures of which are hereby incorporated by reference in their respective entireties.*

BACKGROUND OF THE INVENTION

The invention relates to the transfer of packet-switched data in a system comprising a mobile terminal, a wireless local network and a mobile network.

Packet-switched data transmission services have been developed for mobile terminals. GPRS services (General Packet Radio Service) are widely used in terminals supporting the [GSM] *Global System for Mobile Communication (GSM)* radio technology and packet-switched services of the 3GPP system (Third-Generation Partnership Project) based on the WCDMA (Wideband Code Division Multiple Access) radio technology are also based on [GPRS] *General Packet Radio Services (GPRS).* [PDP] *Packet Data Protocol (PDP)* contexts are generally logical connections on which IP data are transferred from a mobile station to a boundary node (*Gateway GPRS Support Node or* GGSN) in a GPRS/3GPP network and vice versa. Different PDP contexts may be provided with different quality of service (QoS) properties, thereby enabling optimal transmission of time-critical or error-critical data, for instance. In addition, an IP multimedia subsystem IMS is designed in the 3GPP system for providing various IP multimedia services to 3GPP mobile stations (UE; User Equipment). The IMS utilizes PDP contexts for data transfer to or from a mobile station. The IMS includes functions that enable the negotiation of an end-to-end session on the application plane using the SIP protocol (Session Initiation Protocol), the features of session being for instance the codecs used, the termination points and the quality of service (QoS). For arranging the negotiated end-to-end quality of service also in the 3GPP network, a service based local policy (SBLP) is applied. The IMS includes a call session control function (CSCF), which includes a PDF function (Policy Decision Function) for authorizing quality of service resources (bandwidth, delay, etc.) for an IMS session based on SIP-layer SDP information (Session Description Protocol).

Besides access via the conventional access networks of the PLMN (Public Land Mobile Network) networks, such as the BSS (Base Station Sub-system) of the GSM, a need has also risen to allow access to the services of a PLMN by local networks primarily targeted at providing high speed data transmission in a limited area, such as in on office building. WLAN (Wireless Local Area Network) technologies are very popular today and standardization work has been done in 3GPP to define WLAN-3GPP interworking. This interworking may include the usage of 3GPP subscriber management procedures, such as authentication and charging procedures, as well as data transmission via the 3GPP core network for mobile terminals in a WLAN network. The basic concept is to provide a 3GPP subscriber with access via a WLAN network, also when roaming abroad. 3GPP specification TS 23.234 "3GPP system to Wireless Local Area Network (WLAN) interworking", version 6.0.0, March 2004, defines the system description for WLAN-3GPP interworking.

For WLAN interworking, the 3GPP network is provided with some new network elements or entities. A WLAN Access Gateway (WAG) is a gateway via which the data to/from the WLAN Access Network is transferred to provide the MS with 3G PS based services. A Packet Data Gateway (PDG) is a network element providing access for WLAN roaming mobile terminals to external IP networks, including those supporting 3GPP PS (Packet-switched) domain-based services. An AAA (Authentication, Authorization and Accounting) server may provide authentication and charging services for WLAN roaming mobile terminals.

It is desirable that end-to-end QoS negotiation also be provided for mobile terminals roaming in WLAN networks. The above-mentioned 3GPP specification TS 23.234 defines on page 29 that the PDG performs the functions of a service-based local policy enforcement point (PEP) and communicates with a policy decision function to allow a service-based local policy. QoS interworking information may be obtained from the policy decision function. IETF RFC (Request For Comments) 2753 "A Framework for Policy-based Admission Control", R. Yavatkar et al., January 2000, describes a framework for providing policy-based control and a client-server protocol for communication between a policy server (PDP; Policy Decision Point) and its client (PPP). However, the 3GPP specification TS 23.234 does not disclose how to arrange the adoption of the policy for the terminal in the WLAN-3GPP interworking system.

BRIEF DESCRIPTION OF THE INVENTION

The object of the invention is thus to provide a method and equipment for implementing the method so as to enable an enhanced data transfer method for terminals visiting a wireless local network. The objects of the invention are achieved by a method, a system, a network element, a wireless terminal, and computer programs, which are characterized by what is stated in the independent claims. Some preferred embodiments are disclosed in the dependent claims.

According an aspect of the invention, end-to-end service related parameters are signalled via a separate signalling element. A resource authorization identifier is received in the mobile terminal from the signalling element. The resource authorization identifier is transmitted to the mobile network via the local network. Authorization is requested from the signalling element by the mobile network on the basis of the resource authorization identifier. A tunnel between the mobile terminal and the mobile network is bound to the end-to-end data flow of the mobile terminal on the basis of an authorization response received from the signalling element and comprising identification information on the end-to-the end data flow and tunnel identification information identifying the tunnel.

The advantage of the invention is that a policy authorized by a signalling element, such as a SIP end-to-end quality-of-service negotiation signalling element, may be used in a system in which the mobile terminal accesses the mobile network via a wireless local network. Thus, it is-possible to arrange a service in the local system comprising the mobile network and the wireless local network on the basis of a confirmation from the signalling element. By the authorization, it is possible to achieve mapping between the data now in the system of the mobile network and the wireless local network and the end-to-end data flow.

In one embodiment, the authorization may comprise information on the allowed quality of service, and the underlying data transmission resources in the system are adapted according to this QoS information.

BRIEF DESCRIPTION OF THE FIGURES

In the following, some preferred embodiments of the invention will be described in detail with reference to the accompanying drawings, in which FIG. 1 generally illustrates a WLAN-3GPP interworking system.

DETAILED DESCRIPTION OF THE INVENTION

The method of an embodiment is illustrated next with reference to an exemplary WLAN-3GPP interworking system shown in FIG. 1. However, the invention is applicable to any packet-switched telecommunication system for mobile terminals visiting wireless local networks. Besides a system incorporating a 3GPP network, the method of the invention is applicable to a system in accordance with a second-generation GPRS service, for instance. The local network is, in accordance with an embodiment, a wireless local area network employing user authentication and network access control according to an IEEE 802.1x standard, such as a wireless local area network according to the IEEE 802.11i standard. However, the invention can also be applied to a system comprising another IEEE 802-based wireless local area network or some other type of local networks, typically to networks operating at un-licensed frequency bands, such as a network according to the BRAN (Broadband Radio Access Networks) standard, a Home RP network or a Bluetooth network. The BRAN standards comprise High Performance Radio Local Area Network HIPERLAN standards of types 1 and 2, HIPERACCESS and HIPERLINK standards.

Figure 1:
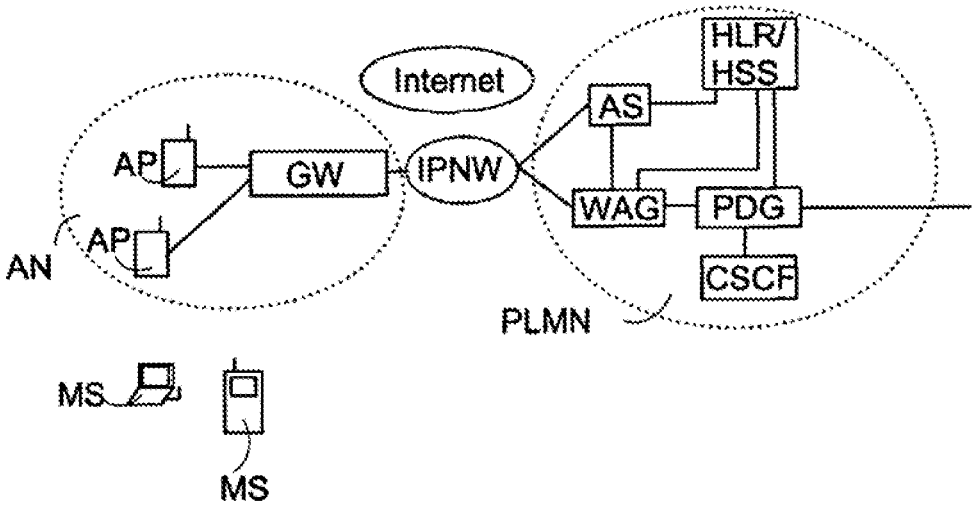

Reference is made to FIG. 1, wherein the main parts of a mobile system include a WLAN access network AN, a 3GPP network part PLMN comprising network elements for WLAN interworking, and a mobile station MS, also called user equipment UE in 3GPP specifications. It is to be noted that the WLAN-3GPP interworking specification work is not finished at the time of filing of the present application, and the basic principles of the present invention can also be applied to modified WLAN-3GPP interworking systems.

The WLAN access network AN and the 3GPP network PLMN can communicate over an IP-based (Internet Protocol) network (IPNW). As shown in FIG. 1, the WLAN access network AN can operate as a UMTS access network, and it can also provide access to other networks, such as the public Internet. The WLAN access network AN comprises access elements called access points AP, which provide a mobile station MS with radio access and thus terminate the broadband radio connection. The access point AP controls the L2 radio interface according to the applied radio technology, which means the IEEE 802.11 standard according to one embodiment. The IEEE 802.11 specifications determine both physical-level and MAC-level protocols for data transmission over the radio interface. The data transmission can utilize either infrared or two spread-spectrum techniques (Direct Sequence Spread-Spectrum DSSS, Frequency Hopped Spread-Spectrum FHSS). Both spread-spectrum techniques utilize a 2.4 GHz band. The MAC layer utilizes a CSMA/CA (Carrier Sense Multiple Access with Collision Avoidance) technique. The AP also manages the bridging of data streams at the radio interface or the routing thereof to and from other network nodes. It is to be noted that instead of a physical access point, WLAN base station, the term access point AP may also refer to a logical WLAN access point which may be accessed by a number of WLAN base stations. The WLAN access network AN may also comprise further WLAN related network elements, such as a control element or a gateway element GW.

The 3GPP network PLMN may comprise a UMTS terrestrial radio access network UTRAN and a UMTS core network CN, or at least some functionality thereof (not shown in FIG. 1). The following describes network elements related to WLAN-3GPP interworking. The 3GPP network PLMN comprises an Authentication, Authorization and Accounting (AAA) server AS, which may provide authentication services and preferably also charging services. Therefore, 3GPP network subscriber data and authentication services can be used for mobile stations MS roaming in the WLAN network AN and comprising a UMTS subscriber identity module USIM and/or a (GSM) SIM. A mobile station MS user does not necessarily have to have a contract made in advance with the WLAN network AN operator. In such a case, an MS can be charged for the wireless connection provided by the WLAN network AN later on via the PLMN. Even though the AAA server AS is shown as a separate element in FIG. 1, it can be implemented as part of a PLMN network element. A HLR/HSS (Home Location Register/ Home Subscriber Server) located within the 3GPP subscribers home network is the entity containing the authentication and subscription data required the 3GPP subscriber to access WLAN interworking services. The HLR/HSS includes for example information on the quality of service allowed to a subscriber (user profile) and information for the use of services provided by the IMS. The AS communicates authorization information to WLAN and maintains information on the status of the WLAN mobile stations MS.

If the PLMN is not the home network (HPLMN) of the mobile station MS, i.e. the mobile station MS is roaming in the PLMN, the roamed network must communicate with the HPLMN for purposes of authentication and charging. The HPLMN comprises the HLR/HSS, and typically also an authentication centre AuC calculating authentication vectors. An AAA proxy may relay inhumation between the WLAN and the AAA server. AS and carry out subscriber management-related actions in the roamed network. FIG. 1 does not show any other HPLMN elements, such as the 3GMSC or the SGSN, via which the connection to the HER/AuC is typically set up. The 3GPP specifications also refer is to the roamed network as a serving network (SN) and to the HPLMN as merely a home network (HN).

A packet Data Gateway PDG is a network element providing access for WLAN roaming mobile stations MS to external IP networks, including those supporting 3GPP PS Domain based services. The packet data gateway PDG operates as a gateway between the packet radio system of the UMTS network and an external packet data network PDN. External data networks include for instance the UMTS or GPRS network of another network operator, the Internet or a private local area network.

The mobile station MS may be a mobile phone, a table computer with a. WLAN radio interface adapter, or a PDA device, for instance. There may be mobile stations MS of diffemat classes according to their capabilities. The MS may support data transfer via the WLAN access network AN, UTRAN, and/or some other network such as the BSS of GSM, even substantially simultaneously. The mobile station MS is equipped with an IC card including a (U)SIM utilized by a 3GPP subscriber to access the WLAN network for 3GPP interworking purposes.

The WLAN Access Gateway WAG is a gateway via which the data to/from the WLAN Access Network AN is transferred to provide the MS with 3G PS based services. The WLAN Access Gateway resides in the VPLMN in the roaming case, and in the HPLMN in the non-roaming case. The WAG allows a visited 3GPP network PLMN to generate charging information for users accessing via the WLAN AN in the roaming case, enforces the routing of packets through the PDG, performs collection of per tunnel accounting information, and filters out packets based on unencrypted information in the packets. The WAG will forward packets only if they are part of an existing tunnel or expected messages from the MS (service requests and tunnel establishment messages).

For a more detailed description of various. WLAN/3GPP interworking related network elements, reference is made to 3GPP specification TS 23.234, v, 6.0.0, "3GPP to Wireless Local Area Network (WLAN) interworking. System description (Release 6)", March 2004.

A 3GPP packet data system may also comprise many other functions, such as a service control function SCP for intelligent network services, and a charging gateway CGF attending to charging. According to an embodiment, the WLAN-3GPP interworking system supports at least some IMS related features. FIG. 1 illustrates a call session control function CSCF, which may have three different roles; Proxy-CSCF (P-CSCF) which comprises a PDF funtion and transfers SIP messages to other SIP network elements; Interrogating-CSCF (1-CSCF) which is a subscriber home network contact point and determines the serving CSCF (S-CSCF) and forwards SIP requests to the S-CSCF; S-CSCF which is a CSCF controlling the end-to-end session of a mobile station. For a more detailed description of the conventional IMS system features, reference is made to 3GPP specification 3GPP TS 23.228, v.6.5.0 (March 2004), 'IP Multimedia Subsystem (IMS); Stage 2; Release 6'. A suitable method for session establishment and QoS selection in the WLAN-3GPP interworking system utilizing IMS principles is illustrated later is connection with FIG. 3.

To obtain the packet-switched services of the WLAN network AN, the mobile station MS has to perform a WLAN technology-specific access procedure, making the location of the MS known at the selected WLAN network AN. In the case of an IEEE 802.11 network, the MS performs an association procedure. The MS is then able to communicate with an access point AP of the WLAN network. PLMN network selection for the MS may be carried out. Network selection and advertisement procedures are described in Chapter 5.4 of the 3GPP TS 23.234. An authentication procedure may be initiated by the MS by sending a network access identifier (NAI) to the WLAN AP which determines the correct (home) AAA server AS and forwards the authentication request to the correct AAA server AS. The WLAN authentication and authorization by the 3GPP AAA server involves the use of an EAP (Extensible Authentication Protocol) Authentication and Key Agreement (AKA) procedure. The WLAN mobile station MS uses the NAI as identification towards the 3GPP, WLAN AAA server AS. In this procedure, the subscriber identity module (SIM) information and corresponding information in. HLR may be used. If the authentication is successful, the MS may register as a WLAN user to the 3GPP network PLMN. More details on WLAN access and authorization are described in Chapter 7.2 of the 3GPP TS 23.344 specification.

Figure 2:
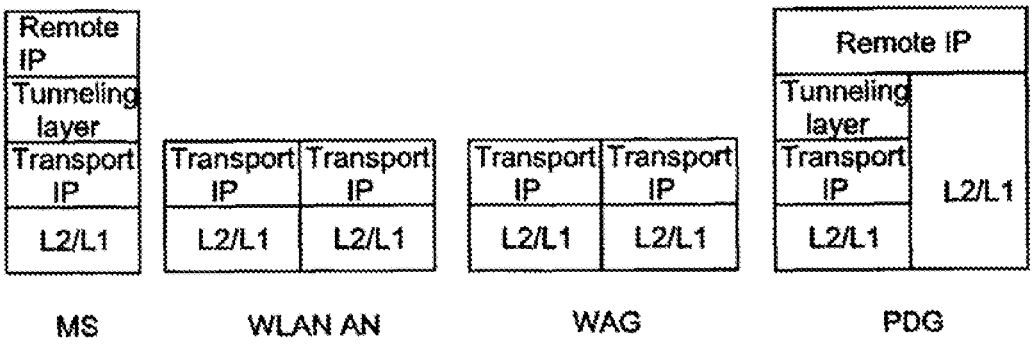
FIG. 2 shows the WLAN-3GPP interworking protocol architecture.

To receive and transmit packet-switched data, a registered mobile station MS has to activate at least one tunnel. This makes the MS known to the PDG and creates a logical data transfer context at the mobile station MS, the WAG and the PDG. The protocol stack between the MS and the PDG is illustrated in FIG. 2. When the tunnel is being established, a remote IP address identifying the mobile station MS, which could be an IPv4 or IPv6 address, is defined for the MS. A local IP address of the MS identifies the WLAN MS in the WLAN AN, i.e. the local IP address is used at the Transport IP layer. The remote IP address can be assigned by the home-PLMN, visited-PLMN or an external IP network. In addition to other tunnel related data, such as the negotiated QoS profile, the remote IP address is defined in tunnel information maintained by the PDG.

The tunnel establishment is not coupled to WLAN access authentication/authorization. The WLAN UE may establish several tunnels in order to access several external IP networks simultaneously. External IP network selection is performed as part of the establishment of each tunnel, and the mobile station MS may indicate a preferred WLAN access point name (W-APN).

According to an embodiment, in order to implement a service-based local policy in the WLAN-3GPP interworking system, the PDG comprises a PEP function (Policy Enforcement Point) similar to that of the 3GPP IMS system. However, there are no PDP contexts and associated mechanisms (as those available for GPRS terminals) for roaming WLAN terminals connecting to the PDG via a WLAN network and the WLAN access gateways. Thus, the policy adoption arrangement in the present WLAN-3GPP interworking system differs from that for GPRS terminals. The PEP function controls the offering of quality-of-service resources to the data flow according to the authorization received from the PDF. For binding the authorization decision, the PDF creates a resource authorization identifier, which may be referred to as an authorization token as in the IMS system, for the session and transmits it to the mobile station MS. When the tunnel is being established, the mobile station MS is configured to send to the PDG an authorization token and at least one flow identifier that constitute binding information. The flow identifier identities the IP media flow associated with the SIP session. There may be a flow identifier for each media component that is to be transferred end to end. The. PDG requests authorization for allocating resources to the session indicated by the binding information from the PDF, which is located at the P-CSCP (Proxy CSCF). The PDF functionality makes a final decision on resource allocation to the session and responds to the PDG.

On the basis of the authorization from the PDF, the PDG arranges binding for the external data flow to a tunnel between the MS and the PDG. The gating/filtering functionality offered by the PEP thus tends to identify a given flow or a group of flows by including information about possible header fields in the form of a set of packet filter parameters, i.e. packet filters. The PEP may be arranged to directly map the data flows received from external networks into the correct tunnels on the basis of the packet filters, one or more packet classification parameters (e.g. destination gate/source IP address) being specified in a packet filter. The packet filter(s) may be completely defined, when establishing the logical application-plane connection for the data flow, from identifying identifiers at the P-CSCF element (PDF function), and transferred to the PDG (PEP function). The PEP function may determine a gate by the packet filters for the data flow which it binds to at least one tunnel based on a tunnel identifier. Packet filters could be tunnel-specific, whereby each packet filter is bound to one tunnel.

Figure 3:
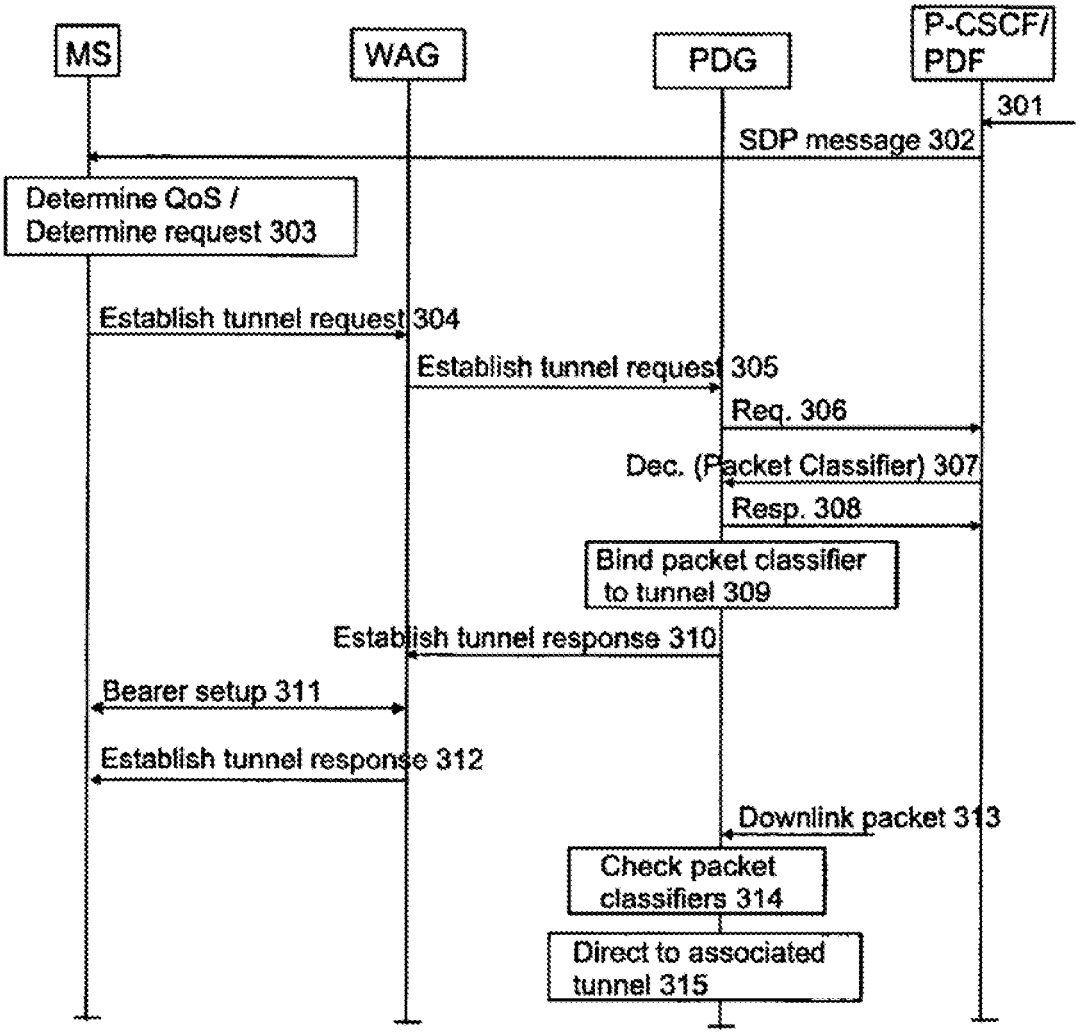
FIG. 3 is a flow diagram of an embodiment of the invention.

FIG. 3 shows a signalling diagram illustrating in more detail the establishment or modification of a tunnel between the MS and the PDC when applying a service-based local policy in accordance with a preferred embodiment of the invention. The P-CSCF receives 301 a SIP SDP message including the necessary information about the application-plane session to be set up, such as termination points and the bandwidth requirement. The message 301 may originate for instance from another CSCF element (S-CSCF) because of a session invite request from another party to the application-plane logical connection or the mobile station MS. The PDF function authorizes the quality of service resources (bandwidth, delay, etc.) for the IMS session based on the SDP information. The PDF creates an authorization token for the session and sends 302 the authorization token in an SDP message to the mobile station MS. For a more detailed description of the communication between the P-CSCF (PDF) and the mobile station MS, reference is made to 3GPP specification 3GPP TS 23.207, v. 6.2.0, 'End-to-End QoS Concept and Architecture; Release 6'.

In one embodiment, the mobile station MS comprises a translation/mapping function adapting 303 the application-plane (or IP-plane) quality of service requirements to the WLAN-3GPP interworking system quality of service parameters, i.e. it specifies the QoS parameters to be requested for the tunnel for user data transmission. When the tunnel is being established, the mobile station MS sends 304 to the selected PDG a tunnel establishment or modification request including not only the conventional data of a tunnel establishment request but also an authorization token and at least one flow identifier, in one embodiment the tunnel identifier. In an alternative embodiment, the mobile station MS does not itself adapt the QoS requirements but the network, preferably the PDG, does the adaptation. In this embodiment, the tunnel establishment message 304 does not specify any MS determined QoS parameters; In a further embodiment, no QoS requirement information is sent from the MS but the PDG determines the QoS on the basis of the authorization from the PDG.

The PDG receives the request 305 and determines the appropriate P-CSCF (PDF) on the basis of the authorization token. The PDG transmits 306 a request to authorize the required resources to the PDF functionality of the P-CSCF indicated by the authorization token. This request comprises the binding information. When the PDF of the P-CSCF finds the IP flow information corresponding to the request 306, it makes the final decision about allocating resources to the session. The PDF transmits 307 a response including the policy to the PDG. The authorization response includes an authorization token, at least one packet classification parameter (packet classifier) negotiated on the application plane and intended as the filter, and QoS information (maximum QoS). In one embodiment, other information similar to that of the Go interface between the CSCF and the PDG in 3GPP specification 3GPP TS 23.207, v. 6.0.0 'End-to-End QoS Concept and Architecture (Release 6)' may also be used.

The PDG typically responds 308 to the decision message 307. If the PDF allows resource allocation, the PDG may then bind the information in the authorization response to an identifier referring directly or indirectly to a tunnel, i.e. to a tunnel already existing or being established between the MS and the PDG. The tunnel between the mobile terminal and the mobile network is thus bound to the end-to-end data flow of the mobile terminal on the basis of the authorization response received 307 from the signalling element and comprising identification information on the end-to-end data flow (for instance the source IP address) and tunnel identification information identifying the tunnel. The PDG can thus arrange a tunnel between the MS and-the PDG provided-with properties in accordance with the authorization 307 and the request 304. The PDG may check, based on the quality of service information received from the PDF, that the quality of service requested for the tunnel does not exceed the quality of service negotiated on the application plane and authorized by the PDF. In one embodiment, the PDG comprises a translation/mapping function which adapts the authorized QoS information to appropriate QoS parameters in the WLAN-3GPP interworking system. Underlying WLAN and/or 3GPP connection resources may be reserved (309) in accordance with the quality of service adapted by the WLAN-3GPP interworking system, preferably by the PDG, from the quality of service parameters of the IP plane or application plane of the mobile station MS (unless the PDG has had to restrict the requested quality because of subscriber data or its own resource limitations, for example). Based on the response 307, the PDG (PEP function) may in one embodiment generate 309 a logical gate, which implements access control according to the decision of the PDF based on the at least one packet classification parameter obtained from the PDF as its packet filter parameter for one or more tunnels to the MS. The packet classifier may be based on the IP-address and port number, for instance. The gate is bound 309 to the tunnel being established based on a (tunnel) identifier distinguishing it from other tunnels. Other information received from the PDF may also be stored in the PDG.

In one embodiment, the PDG sends a response 310 to the WAG; however, such response may be not necessary. The PDG may transmit information (possibly via the AAA proxy) for arranging filtering in the WAG according to the policy authorized by the PDF. The WAG may arrange filtering based on this information. The WAG may initiate the establishment of a radio network service, whereby a new WLAN-3GPP bearer is set up or modified 311 for the mobile station MS. If the requested QoS attributes cannot be provided for instance on the basis of the subscription, the WAG informs this to the PDG, which confirms new QoS attributes. The WAG sets the packet flow identifier and the radio priority in accordance with the negotiated QoS and responds 312 to the mobile station MS. In art alternative embodiment, the QoS resources are arranged locally in the WLAN network AN on the basis of the information from the PDG. For instance, the QoS may be arranged locally by WSM (Wi-Fi Scheduled Multimedia) being specified for IEEE 802.11e technology.

The mobile station MS updates its connection information with the tunnel and the WLAN-3GPP hearer. The MS is now able to send and receive data packets of the logical connection negotiated on the application plane and use the tunnel. After step 312, an application of the mobile station MS or the entity reserving quality of service for it is still able to send the necessary messages to finally activate the end-to-end session. For example, an application using the RSVP protocol may send and receive RSVP path and RSVP response messages, based on which the underlying WLAN-3GPP interworking system transmission resources can also be updated. Besides the above-described features, other features may be performed in the WLAN-3GPP interworking system during tunnel establishment/modification. As an example, the PDG contacts the AAA server AS for authorization of the MS.

The PDG is then able to transfer received downlink packets fulfilling the filter conditions defined for the gate to the mobile station using the tunnel that is associated with the gate. When a packet is received 313 from an external packet data network, its header fields are checked 314. When doing this, the PDG compares the header fields of the packets received from the external IP network PDN with the packet classifiers of the gates, based on which the PDG knows if the packets can be forwarded to the terminal, and, if so, which tunnel is to be applied to each IP packet. If a gate is found, whose packet classifiers the packet corresponds to, i.e. the header fields of the packet correspond to the set of packet classification parameters determined by the PDF at the PDG (PEP function), the PEP determines the identifier of the tunnel associated with the gate and directs 315 the packet to be transferred in accordance with the tunnel and the underlying WLAN network resources defined therein. If the packet identifiers do not conform to the filter conditions bound to the tunnel, the packet cannot be transferred by means of the tunnel. It is to be noted that the messages illustrated in FIG. 3 are only one example of arranging the data transmission and the ongoing 3GPP-WLAN development work may lead to another kind of network structure/signalling arrangement.

The features illustrated in association with FIG. 3 can also be utilized such that the tunnel arranged for signalling connectivity to the P-CSCF is also utilized for user data transmission between the MS and the PDG, whereby no tunnel establishment messages are required but instead messages of other type may be used between the MS and the PDG. In another embodiment, a first tunnel between the mobile station MS and a first network element (PDG) of the mobile network is established for end-to-end service parameter signalling (via the P-CSCF), and a second tunnel between the mobile station MS and a second network element of the mobile network (another PDG) is established for user data transmission after the reception of the (resource authorization) identifier.

The applicability of the functions illustrated above are not limited to any specific tunnelling technique. In one embodiment, tunnels are IPSec tunnels and identified by at least one IPSec tunnel specific identifier which may be used when binding authorization (and the classification parameters thereof) to the tunnel and when arranging underlying data transmission resources.

In this embodiment, the IPSec tunnel may be established between the MS and the PDG by utilizing the IKE (Internet Key Exchange) protocol. First the MS and the PDG perform a key exchange by Diffie-Hellman procedure and generate an IKE security association. In one embodiment, the IKE security association is authenticated by using an EAP (Extensible Authentication Protocol) SIM or EAP AKA (Authentication and Key Agreement) procedure. After this, separate security associations are negotiated for user traffic. These associations are referred to as CHILD SAs. In the present embodiment, the SIP signalling could have a specific CHILD AS, and no policy control would be needed for the SIP signalling. Thus, the token could be transferred to the mobile station (step 302 in FIG. 3) by a payload packet protected by the IPsec using the CHILD AS. In one embodiment, the token transferred from the mobile station MS to the PDG is included in a field of a CREATE CHILD AS negotiation message used for negotiating security association between the MS and the PDG. One or more new data fields can be reserved in these messages for transferring the token. In another embodiment, INFORMAL negotiation of the IPsec is used to deliver the parameters required for arranging the policy control by the PDG. These parameters can be associated with an earlier negotiated CHILD SA which could be the one already negotiated for the SIP session.

Thus, the token could be bound to a CHILD AS security association identified by an SPI (security parameter index) and possibly with the mobile station's and/or PDG's IP address. This SPI is also included in user-plane packets of the IPsec ESP (encapsulating security payload) or AH protocols.

In an embodiment, different media types/components, typically audio, video and data, are allocated with different flow identifiers. In this embodiment, the mobile terminal MS may in step 303 generate the flow identifiers for the media types. The request for establishing/modifying the tunnel may thus comprise more than one flow identifier possibly relating to the same token. With this embodiment, it is possible to separate different media types and even reserve different QoS for different media types.

In one embodiment, the tunnel and/or underlying connection reservations may also be modified later. The features illustrated above are applicable between the MS and PDGs in the home PLMN or in visited PLMN.

In an alternative embodiment differing from FIG. 3, the authorization token is sent using an already established tunnel, i.e. the end-to-end QoS adaptation based an the authorization of the PDF is separate from the tunnel establishment procedure and the data transmission resources in WLAN network AN and/or the PLMN may be adapted according to the authorization.

It is to be noted that the authorization identifier from the PDF may be some other identifier than the authorization token or that the authorization token may differ in contents from that for GPRS services. Further, for non-session based applications some binding information may be used.

The invention can be implemented in a mobile station and in network elements (in an embodiment, in the mobile station MS and in the PDG) by respective computer program codes executed in a processor of the respective device. Computer program codes can be received via a network and/or be stored in memory means, for instance on a disk, a CD-ROM disk or other external memory means, from which they can be loaded into the memory of the processing device. Hardware solutions or a combination of software and hardware solutions may also be used. A chip unit or some other kind of module for controlling the network element (or the mobile station MS) may in one embodiment cause the device to perform the inventive functions in the network element (or the mobile station MS).

It is obvious to a person skilled in the art that as technology advances, the basic idea of the invention can be implemented in a variety of ways. The invention and its embodiments are thus not limited to the above examples, but may vary within the claims. Different features may thus be omitted, modified or replaced by equivalents.

The invention claimed is:

1. A method of arranging transmission of packet data in a system comprising a mobile terminal, a wireless local network and a mobile network, the method comprising:

signaling end-to-end service related parameters for communication between the mobile terminal and the wireless local network, communicating a resource authorization identifier from a policy decision function to the mobile terminal via the wireless local network, wherein the resource authorization identifier is an authorization token in an internet protocol multimedia subsystem, receiving a request for authorization from the mobile network on the basis of the resource authorization identifier, receiving an authorization response to bind a tunnel between the mobile terminal and the mobile network to an end-to-end data flow of the mobile terminal, wherein the authorization response comprises identification information on the end-to-end data flow and tunnel identification information identifying the tunnel, transmitting at least one filter or gate parameter to the mobile network, wherein the at least one filter or gate parameter is associated with the tunnel, and filtering or gating is arranged in the mobile network to or from the tunnel based on the association, wherein a first tunnel between the mobile terminal and a first network element of the mobile network is established for end-to-end service parameter signaling, and a second tunnel between the mobile terminal and a second network element of the mobile network is established for user data transmission after the reception of resource authorization identifier, and wherein the receiving the request for authorization from the mobile network on the basis of the resource authorization identifier comprises receiving the request at the policy decision function from a packet data gateway (PDG), wherein the PDG is configured to arrange a binding of the tunnel on the basis of the authorization from the policy decision function.

2. A method as claimed in claim 1, wherein the same tunnel between the mobile network and a network element of the mobile network and utilizing the data transmission resources of the local network is used for signalling purposes and for user data transmission.

3. A method as claimed in claim 1, wherein the tunnel between the mobile terminal and the mobile network is an IPSec tunnel, whereby the tunnel is established by utilizing an IKE (Internet Key Exchange) protocol.

4. A method as claimed in claim 3, wherein an association is arranged between the tunnel and a 3GPP-WLAN interworking system bearer.

5. A method as claimed in claim 1, wherein the mobile network is a 3GPP network offering a packet-switched service comprising at least one network element supporting access via a WLAN (Wireless Local Area Network).

6. The method of claim 1, wherein the policy decision function is a component of a proxy call session control function.

7. The method of claim 1, wherein the policy decision function is separate from an Authentication, Authorization, and Accounting (AAA) server.

8. A wireless system comprising a mobile terminal, a wireless local network, a network element, a signaling element and a mobile network, wherein the wireless local network is configured to provide data transmission for the mobile terminal, the mobile terminal is configured to receive a resource authorization identifier from a policy decision function during a negotiation of end-to-end service related parameters, the mobile terminal is configured to transmit the resource authorization identifier to the mobile network via the wireless local network, wherein the resource authorization identifier is an authorization token in an internet protocol multimedia subsystem, the mobile network is configured to request authorization from the policy decision function on the basis of the resource authorization identifier, the mobile network is configured to bind a tunnel between the mobile terminal and the mobile network to an end-to-end data flow of the mobile terminal on the basis of an authorization response received from the policy decision function and comprising identification information on the end-to-end data flow and tunnel identification information identifying the tunnel, wherein the network element is configured to transmit at least one filter or gate parameter from the signaling element to the mobile network, the network element is configured to associate the at least one filter or gate parameter with the tunnel utilizing local network resources, and the network element is configured to arrange filtering or gating in the mobile network to or from the tunnel based on the association, wherein the network element is configured to establish a first tunnel between the mobile terminal and a first network element of the mobile network for the mobile terminal signaling, and a second tunnel between the mobile terminal and a second network element of the mobile network for user data transmission after the reception of a resource authorization identifier, and wherein the request for authorization from the mobile network on the basis of the resource authorization identifier comprises receiving the request at the policy decision function from a packet data gateway (PDG), wherein the PDG is configured to arrange a binding of the tunnel on the basis of the authorization from the policy decision function.

9. A network element for a mobile network connectable to a wireless local network providing data transmission for a mobile terminal, wherein the network element is configured to establish a tunnel with a mobile terminal for transferring information with the mobile terminal accessing the mobile network via the wireless local network, the network element is configured to receive a resource authorization identifier from the mobile terminal, wherein the resource authorization identifier is an authorization token in an internet protocol multimedia subsystem, the network element is configured to request authorization from a policy decision function on the basis of the resource authorization identifier, the network element is configured to bind a tunnel between the mobile terminal and the mobile network to an end-to-end data flow of the mobile terminal on the basis of an authorization response received from the policy decision function and comprising identification information on the end-to-end data flow and tunnel identification information identifying the tunnel, wherein the network element is configured to transmit at least one filter or gate parameter from a signaling element to the mobile network, the network element is configured to associate the at least one filter or gate parameter with the tunnel utilizing local network resources, the network element is configured to arrange filtering or gating in the mobile network to or from the tunnel based on the association, wherein the network element is configured to establish a first tunnel between the mobile terminal and a first network element of the mobile network for the mobile terminal signaling, and a second tunnel between the mobile terminal and a second network element of the mobile network for user data transmission after the reception of the resource authorization identifier, and wherein the request for authorization on the basis of the resource authorization identifier comprises receiving the request at the policy decision function from a packet data gateway (PDG), wherein the PDG is configured to arrange a binding of the tunnel on the basis of the authorization from the policy decision function.

10. A network element according to claim 9, wherein the network element is configured to use the same tunnel between the mobile network and a network element of the mobile network and utilizing the data transmission resources of the local network for signalling purposes and for user data transmission.

11. A network element according to claim 9, wherein the tunnel between the mobile terminal and the mobile network is an IPSec tunnel, whereby the tunnel is established by utilizing an IKE (Internet Key Exchange) protocol.

12. A network element according to claim 9, wherein the network element is a 3GPP network element offering as pocket-switched service for a mobile terminal accessing a WLAN (Wireless Local Area Network).

13. A *system comprising:*

*a* wireless terminal, wherein the wireless terminal is configured to connect to a wireless local network, the wireless terminal is configured to establish a tunnel with a network element of a mobile network via the wireless local network, the wireless terminal is configured to receive a resource authorization identifier from a separate policy decision function during [a] *the* negotiation of end-to-end service related parameters, wherein the resource authorization identifier is an authorization token in an internet protocol multimedia subsystem, the wireless terminal is configured to transmit the resource authorization identifier to the mobile network by using the tunnel[.] wherein the tunnel between the [mobile] *wireless* terminal and [the] mobile network is an IPSec tunnel, whereby the tunnel is established by utilizing an IKE (Internet Key Exchange) protocol, wherein the network element is configured to transmit at least one filter or gate parameter from a signaling element to the mobile network, the network element is configured to associate the at least one filter or gate parameter with the tunnel utilizing local network resources, and the network element is configured to arrange filtering or gating in the mobile network to or from the tunnel based on the association, wherein the network element is configured to establish a first tunnel between the [mobile] *wireless* terminal and a first network element of the mobile network for the [mobile] *wireless* terminal signaling, and a second tunnel between the [mobile] *wireless* terminal and a second network element of the mobile network for user data transmission after the reception of a resource authorization identifier, and wherein a request for authorization from the mobile network on the basis of the [resource] *resources* authorization identifier comprises receiving the request at the separate policy decision function from a packet data gateway (PDG), wherein the PDG is configured to arrange a binding of the tunnel on the basis of the authorization from the separate policy decision function.

14. A wireless terminal as claimed in claim 13, wherein the tunnel is used for signaling purposes and for user data transmission.

15. A wireless terminal as claimed in claim 13, wherein a first tunnel is established for end-to-end service parameter signalling, and a second tunnel is established for user data transmission after the reception of the resource authorization identifier.

16. A non-transitory computer readable medium encoded with computer executable instructions configured to:

receive a resource authorization identifier from a mobile terminal of a mobile network, wherein the resource authorization identifier is an authorization token in an internet protocol multimedia subsystem, request authorization from a policy decision function on the basis of the resource authorization identifier, and bind a tunnel between the mobile terminal and the mobile network to an end-to-end data flow of the mobile terminal on the basis of an authorization response received from the policy decision function and comprising identification information on the end-to-end data flow and tunnel identification information identifying the tunnel, wherein the tunnel between the mobile terminal and the mobile network is an IPSec tunnel, whereby the tunnel is established by utilizing an IKE (Internet Key Exchange) protocol, wherein a network element is configured to transmit at least one filter or gate parameter from a signaling element to the mobile network, the network element is configured to associate the at least one filter or gate parameter with the tunnel utilizing local network resources, and the network element is configured to arrange filtering or gating in the mobile network to or from the tunnel based on the association, wherein the network element is configured to establish a first tunnel between the mobile terminal and a first network element of the mobile network for the mobile terminal signaling, and a second tunnel between the mobile terminal and a second network element of the mobile network fur user data transmission after the reception of a resource authorization identifier, and wherein the request for authorization from the policy decision function on the basis of the resource authorization identifier comprises receiving the request at the policy decision function from a packet data gateway (PDG), wherein the PDG is configured to arrange a binding of the tunnel on the basis of the authorization from the policy decision function.

17. A wireless system comprising:

a wireless network, a policy decision function, a network element and a signaling element;

[the] *a* wireless network configured to provide data transmission in a network;

[the] *a* policy decision function coupled to the wireless network and configured to provide a resource authorization identifier during [a] *the* negotiation of end-to-end service related parameters, wherein the resource authorization identifier is an authorization token in an internet protocol multimedia subsystem;

wherein the wireless network is configured to request authorization from the policy decision function on the basis of the resource authorization identifier, and to bind a tunnel for an end-to-end data flow on the basis of an authorization response received from the policy decision function and comprising identification information on the end-to-end data flow and tunnel identification information identifying the tunnel, wherein the network element is configured to transmit at least one filter or gate parameter from the signaling element to the [mobile] *wireless* network, the network element is configured to associate the at least one filter or gate parameter with the tunnel utilizing local network resources, and the network element is configured to arrange filtering or gating in the [mobile] *wireless* network to or from the tunnel based on the association, wherein the network element is configured to establish a first tunnel between [a] *the* mobile terminal and a first network element of the [mobile] *wireless* network for the mobile terminal signaling, and a second tunnel between the mobile terminal and a second network element of the [mobile] *wireless* network for user data transmission after the reception of a resource authorization identifier, and wherein the request for authorization from the policy decision function on the basis of the resource authorization identifier comprises receiving the request at the policy decision function from a packet data gateway (PDG), wherein the PDG is configured to arrange a binding of the tunnel on the basis of the authorization from [the] policy decision function.

18. A method of arranging transmission of packet data in a system comprising a mobile terminal, a wireless local network and a mobile network, the method comprising:

signaling end-to-end service related parameters for communication between the mobile terminal and the wireless local network, receiving a resource authorization identifier from a policy decision function at the mobile terminal, wherein the resource authorization identifier is an authorization token in an internet protocol multimedia subsystem, sending a request for authorization on the basis of the resource authorization identifier, and sending an authorization response to bind a tunnel between the mobile terminal and the mobile network to an end-to-end data flow of the mobile terminal wherein the authorization response comprises identification information on the end-to-end data flow and tunnel identification information identifying the tunnel, transmitting at least one filter or gate parameter to the mobile network, wherein the at least one filter or gate parameter is associated with the tunnel, and filtering or gating is arranged in the mobile network to or from the tunnel based on the association, wherein a first tunnel between the mobile terminal and a first network element of the mobile network is established for end-to-end service parameter signaling, and a second tunnel between the mobile terminal and a second network element of the mobile network is established for user data transmission after the reception of resource authorization identifier, and wherein the request for authorization on the basis of the resource authorization identifier comprises receiving the request at the policy decision function from a packet data gateway (PDG), wherein the PDG is configured to arrange a binding of the tunnel on the basis of the authorization from the policy decision function.

*19. A network element configured to receive a resource authorization identifier from a mobile terminal, wherein the resource authorization identifier is an authorization token in an internet protocol multimedia subsystem, wherein the network element is further configured to:*

*request authorization from a policy decision function on the basis of the resource authorization identifier, wherein the resource authorization identifier is an authorization token in an internet protocol multimedia system*

*bind a tunnel between the mobile terminal and a mobile network to an end-to-end data flow of the mobile terminal on the basis of an authorization response received from the policy decision function and comprising identification information on the end-to-end data flow and tunnel identification information identifying the tunnel,*

*transmit at least one filter or gate parameter from a signaling element to the mobile network,*

*associate the at least one filter or gate parameter with the tunnel utilizing local network resources,*

*arrange filtering or gating in the mobile network to or from the tunnel based on the association, and*

*establish a first tunnel between the mobile terminal and a first network element of the mobile network for the mobile terminal signaling, and a second tunnel between the mobile terminal and a second network element of the mobile network for user data transmission after the reception of the resource authorization identifier,*

*wherein the request for authorization on the basis of the resource authorization identifier comprises receiving the request at the policy decision function from a packet data gateway (PDG), and wherein the PDG is configured to arrange a binding of the tunnel on the basis of the authorization from the policy decision function.*

*20. The network element according to claim 19, wherein any terminal between the mobile terminal and the mobile network is configured to use the same tunnel between the mobile terminal and the mobile network for signaling purposes and for user data transmission.*

*21. The network element according to claim 19, wherein the tunnel between the mobile terminal and the mobile network is an IPSec tunnel, and wherein the tunnel is established by utilizing an internet key exchange protocol.*

*22. The network element according to claim 19, wherein the network element comprises a network element offering a packet-switched service for a mobile terminal accessing an ad hoc wireless local area network.*

*23. The network element according to claim 19, wherein the authorization token is configured to be received by the mobile terminal via a payload packet during a security negotiation with the network element.*

*24. The network element according to claim 19, wherein the mobile terminal is configured to transfer the authorization token to the network in a field of a negotiation message.*

*25. A method of arranging transmission of packet data in a system comprising a mobile terminal and a mobile network, the method comprising:*

*communicating a resource authorization identifier from a policy decision function to the mobile terminal, wherein the resource authorization identifier is an authorization token in an internet protocol multimedia subsystem,*

*receiving a request for authorization from the policy decision function on the basis of the resource authorization identifier,*

*binding a tunnel between the mobile terminal and the mobile network to an end-to-end data flow of the mobile terminal on the basis of an authorization response received from the policy decision function and comprising identification information on the end-to-end data flow and tunnel identification information identifying the tunnel,*

*transmitting at least one filter or gate parameter from a signaling element to the mobile network, wherein the at least one filter or gate parameter is associated with the tunnel, and filtering or gating is arranged in the mobile network to or from the tunnel based on the association;*

*establishing a first tunnel between the mobile terminal and a first network element of the mobile network for the mobile terminal signaling, and a second tunnel between the mobile terminal and a second network element of the mobile network for user data transmission after the reception of the resource authorization identifier, and*

*wherein the receiving the request for authorization from the mobile network on the bases of the resource authorization identifier comprises receiving the request at the policy decision function from a packet data gateway (PDG), wherein the PDG is configured to arrange the binding of the tunnel on the basis of the authorization from the policy decision function.*

*26. The method according to claim 25, wherein the same tunnel between the mobile terminal and mobile network is utilized by another mobile terminal therebetween for signaling purposes and for user data transmission.*

*27. The method according to claim 25, wherein the authorization token is communicated to the mobile terminal via a payload packet during a security negotiation with the mobile network.*

*28. The method according to claim 25, further comprising transferring the authorization token from the mobile terminal to the packet data gateway in a field of a negotiation message.*

*29. A wireless system comprising:*

*a mobile terminal and a mobile network, wherein the mobile terminal and mobile network are connected via a binding tunnel,*

*a network element configured to establish and modify of the binding tunnel on the basis of an authorization command from a second network element, wherein the second network element is connected to the mobile terminal via a second tunnel; and*

*wherein the mobile terminal is configured to request an authorization token of an internet protocol multimedia system from the mobile network, the request for the authorization token comprising a plurality of flow identifiers, wherein each of the plurality of flow identifiers relate to a different media type.*

*30. The wireless system according to claim 29, wherein the network element is a packet data gateway.*

*31. The wireless system according to claim 29, wherein the network element is configured to modify the binding tunnel based on receiving a new set of plurality of flow identifiers from the mobile terminal.*

*32. A method comprising:*

*generating, by a mobile terminal, a plurality of flow identifiers, each of the plurality of flow identifiers relating to a different media type,*

*requesting, by the mobile terminal, an authorization token from a network element of a mobile network, wherein the authorization token is based on the plurality of flow identifiers, wherein the authorization token is a token in an internet protocol multimedia system;*

*receiving, by the mobile terminal, tunnel identification information identifying the binding tunnel, wherein the binding tunnel creates an end-to-end user data flow between the mobile terminal and the mobile network on the basis of an authorization token received from the network element, and*

*requesting, by the mobile terminal, to modify the binding tunnel through a second binding tunnel to a second network element of a mobile network.*

*33. The method according to claim 32, wherein the network element is in communication with a policy decision function.*

*34. The method according to claim 32, further comprising using each of the plurality of flow identifiers to utilize a unique quality of service with the binding tunnel for each communication.*

*35. The method according to claim 32, wherein a second network element performs the modifying of the binding tunnel.*

*36. The method according to claim 35, wherein the second network element comprises a packet data gateway.*

*37. The method according to claim 32, further comprising sending, by the mobile terminal, the new set of flow identifiers through the binding tunnel.*

*38. The method according to claim 32, wherein the subsequent request comprises receiving the request at a policy decision function from the second network element.*

* * * * *